United States Patent
Fasick et al.

(10) Patent No.: US 12,501,858 B2
(45) Date of Patent: Dec. 23, 2025

(54) INTERMEDIATE HEADER HEIGHT ON SELF-PROPELLED WINDROWER FOR OPERATION AT HIGH ROAD SPEED

(71) Applicant: CNH Industrial America LLC, New Holland, PA (US)

(72) Inventors: Gregory Fasick, Mohnton, PA (US); Jeffrey Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 831 days.

(21) Appl. No.: 17/840,014

(22) Filed: Jun. 14, 2022

(65) Prior Publication Data

US 2023/0397534 A1    Dec. 14, 2023

(51) Int. Cl.
*A01D 41/14*    (2006.01)

(52) U.S. Cl.
CPC ......... *A01D 41/145* (2013.01); *A01D 41/141* (2013.01)

(58) Field of Classification Search
None
See application file for complete search history.

(56) References Cited

U.S. PATENT DOCUMENTS

| | | |
|---|---|---|
| 8,548,692 B2 | 10/2013 | Morimoto et al. |
| 9,253,943 B2 | 2/2016 | Buermann et al. |
| 9,693,502 B2 | 7/2017 | Gofron et al. |
| 9,968,033 B2 | 5/2018 | Dunn et al. |
| 10,462,966 B2 | 11/2019 | Smith et al. |
| 2008/0155954 A1* | 7/2008 | Schlipf ............... A01D 41/141 56/10.2 E |
| 2014/0041351 A1* | 2/2014 | Bollin ................. A01D 41/141 56/10.2 E |
| 2017/0064904 A1* | 3/2017 | Figgins ............... A01D 41/141 |
| 2018/0049369 A1* | 2/2018 | Secrest .............. A01D 41/1273 |
| 2018/0271016 A1* | 9/2018 | Milano ................ A01D 33/14 |
| 2021/0127575 A1* | 5/2021 | Farley ................... A01B 63/10 |
| 2022/0110259 A1* | 4/2022 | Vandike ............... A01D 41/02 |
| 2023/0189711 A1* | 6/2023 | Mcdonald ............. G06T 7/579 56/10.2 A |

* cited by examiner

Primary Examiner — Amelia Vorce
(74) Attorney, Agent, or Firm — CM Law PLLC; Stephen J. Weed

(57) ABSTRACT

An agricultural machine system for moving a header of a self-propelled windrower at road speed. A lift device selectively moves the header between a low position, a high position, and an intermediate position such that the header occupies the intermediate position when the agricultural machine system is in a mode of operation associated with road speed.

9 Claims, 4 Drawing Sheets

INTERMEDIATE HEADER HEIGHT ON SELF-PROPELLED WINDROWER FOR OPERATION AT HIGH ROAD SPEED

FIELD OF THE INVENTION

The present invention pertains to agricultural machines, and, more specifically, to self-propelled windrowers.

BACKGROUND OF THE INVENTION

Generally speaking, forage (which can also be referred to herein as crop, crop material, forage crop, forage material, or forage crop material) is plant matter that can be harvested and provided to livestock or other animals as fodder, including but not limited to cattle, sheep, goats, and horses, during, for example, the winter or at other times when pasture land has inadequate amounts of vegetation for livestock or other animals. Depending upon the processing of the forage, forage can be formed into hay or silage. Both hay and silage can be made from grass and legumes (or mixtures thereof), and silage can also be made from, for example, corn or wheat. Hay (whether grass hay, legume hay, or a mixture thereof) results from a process that includes planting (though the plant matter is often perennial), growing, cutting, drying, and storing. Depending upon location, grass hay can include, for example, orchard grass, timothy, fescue, brome, Bermuda grass, Kentucky bluegrass, and/or ryegrass, whereas legume hay can include, for example, alfalfa, clover, and/or birdsfoot trefoil. Silage (which can, at least in some circumstances, also be referred to as haylage) can involve causing the crop material to ferment.

Further, depending upon the desired end product with respect to the forage (i.e., hay or silage), a variety of forage processing operations can be involved, and these forage processing operations include haymaking operations and silage-making operations. Haymaking operations, for example, can include cutting (which can be referred to as mowing), conditioning, tedding, raking, merging, chopping, baling, bale retrieval, transport, and/or storage, and silage-making operations can include not only cutting but also chopping, baling, and/or ensiling (or at least some sort of covering). A variety of agricultural harvesting machines can be used to perform these operations.

One such agricultural harvesting machine is a mower-conditioner machine (which can also be referred to as a mower-conditioner). Such mower-conditioner machines can be formed as a pull-type mower-conditioner coupled with a tractor, or, alternatively, as a header attachment to a self-propelled windrower (which can also be referred to as windrowers). Farmers may operate such mower-conditioners to cut any sort of crop material (hay crop, wheat, etc.) from a field, to immediately condition the crop material, and eventually to deposit the cut crop into swaths or windrows on the field (hereinafter, windrow is used to refer to both swaths and windrows, unless stated otherwise). The cutting can be performed by a cutting mechanism of the mower-conditioner, the cutting mechanism (which can also be referred to as a cutter bar) being, for example, a series of rotary discs (which can be referred to as discs), or a sicklebar. Such conditioning can be performed by a pair of conditioning rolls (which can be referred to collectively as the conditioner) of the mower-conditioner, a crop mat flowing therebetween, and the conditioning can break, split, bend, crush, crack, and/or crimp the crop material, as is known. After conditioning the crop material, the crop material can engage a swath gate of the mower-conditioner and, optionally, windrow shields of the mower-conditioner of the self-propelled windrower, before being deposited on the ground.

Regarding self-propelled windrowers, such windrowers can travel in fields and on roads. While moving, the header can be positioned at a lowest possible height by way of lift arms of the windrower. Upon completion of mowing of a row of crop material or otherwise traveling while not mowing (whether in a field or on a road), the header can be positioned at a highest possible height by way of the lift arms. However, the balance of a self-propelled windrower is such that during aggressive braking events (such as unintended parking brake engagement), the self-propelled windrower can rotate violently about a front tire contact patch, lifting the rear wheels of the self-propelled windrower off of the ground until the header contacts the ground, thereby preventing further pitching forward.

What is needed in the art is a way to reduce the distance that the rear wheels of a self-propelled windrower lifts off the ground during a braking event.

SUMMARY OF THE INVENTION

The present invention provides a way for moving the header of a self-propelled windrower to be moved to an intermediate position for high speed travel.

The invention in one form is directed to an agricultural machine system, including: an agricultural work vehicle including a lift device; a header coupled with the lift device, the lift device configured for selectively moving the header between a plurality of positions associated with a header height including a low position, a high position, and an intermediate position therebetween such that the header occupies the intermediate position when the agricultural machine system is in a predetermined mode of operation.

The invention in another form is directed to an agricultural work vehicle of an agricultural machine system, the agricultural work vehicle including: a lift device, the agricultural work vehicle configured for being coupled with a header, the lift device being configured for selectively moving the header between a plurality of positions associated with a header height including a low position, a high position, and an intermediate position therebetween such that the header occupies the intermediate position when the agricultural machine system is in a predetermined mode of operation.

The invention in yet another form is directed to a method of using an agricultural machine system, the method including the steps of: providing an agricultural work vehicle and a header, the agricultural work vehicle including a lift device, the header being coupled with the lift device; and moving selectively, by way of the lift device, the header between a plurality of positions associated with a header height including a low position, a high position, and an intermediate position therebetween such that the header occupies the intermediate position when the agricultural machine system is in a predetermined mode of operation.

An advantage of the present invention is that it provides a way to reduce the distance that the rear wheels lift off from the ground, so as to provide a more stable platform during a braking event. In so doing, the present invention provides an intermediate lift height of the header on a self-propelled windrower for use when high speed operation is selected, thereby reducing the rotation forward of the self-propelled windrower during violent braking events.

Another advantage of the present invention is that it provides a more stable stopping platform, without requiring unwanted delay in application of parking brake.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with an agricultural vehicle, an agricultural machine, and/or components thereof are usually determined with reference to the direction of forward operative travel of the agricultural vehicle and/or agricultural machine, but they should not be construed as limiting. The terms "longitudinal" and "transverse" are determined with reference to the fore-and-aft direction of the agricultural vehicle and/or agricultural machine and are equally not to be construed as limiting. The terms "downstream" and "upstream" are determined with reference to the intended direction of crop material flow during operation, with "downstream" being analogous to "rearward" and "upstream" being analogous to "forward."

Figure 1:
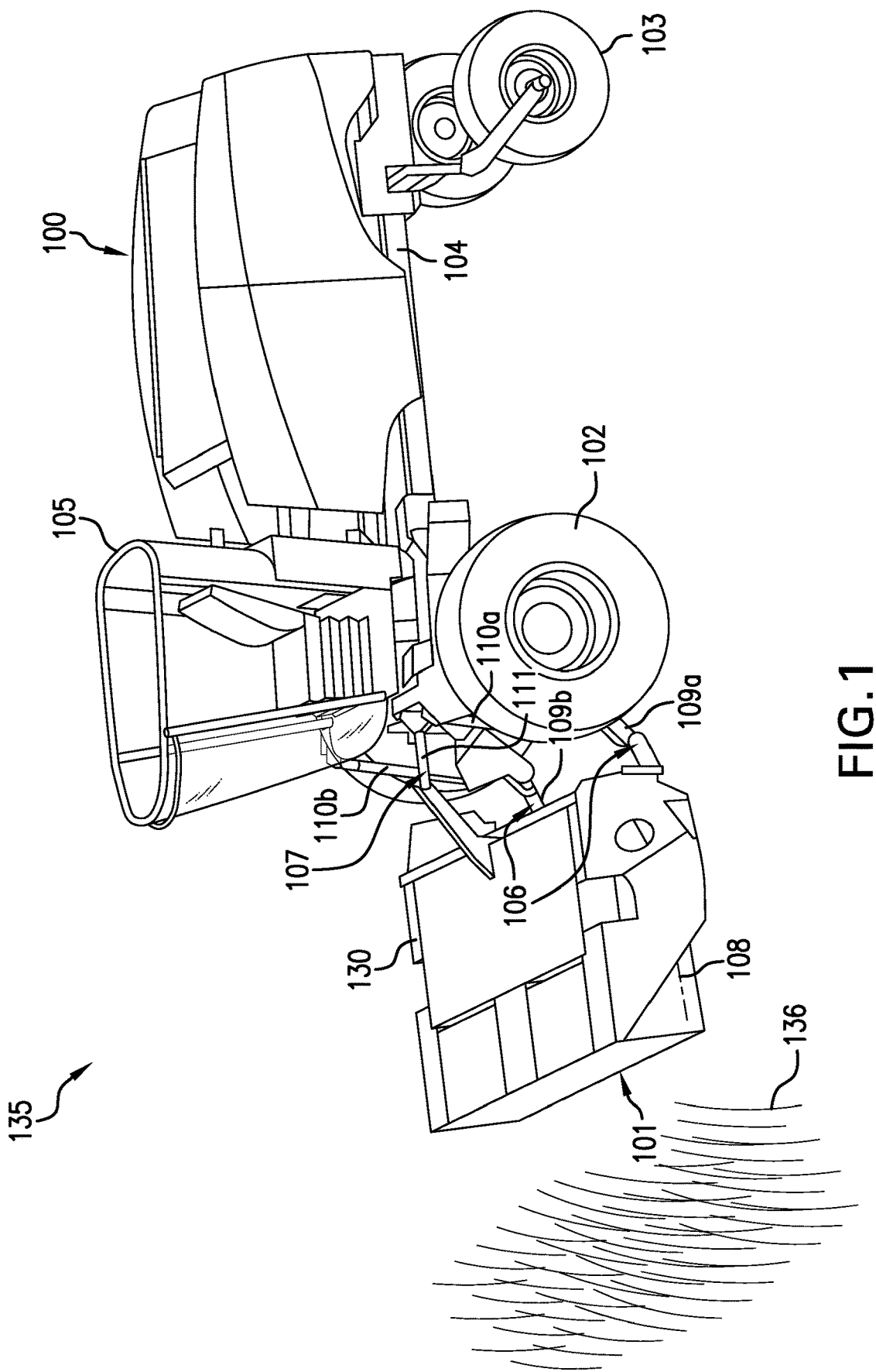
FIG. 1 illustrates schematically a perspective view of an exemplary embodiment of an agricultural machine system including an agricultural vehicle and a header attachment, in accordance with an exemplary embodiment of the present invention.

Referring now to the drawings, and more particularly to FIG. 1, there is shown an embodiment of an agricultural machine system 135 according to the present invention, system 135 including an agricultural work vehicle 100 (which can be referred to as a work vehicle, or an agricultural vehicle) and an agricultural machine 101 (which can be referred to as an agricultural implement, an implement, an attachment, a header, a head, or a header attachment), which is formed as a mower-conditioner machine 101 (which can be referred to as a mower-conditioner) and is coupled with agricultural work vehicle 100, agricultural machine 101 to perform an agricultural operation within a field, namely, mowing and conditioning.

As shown, work vehicle 100 can be configured as a self-propelled windrower 100. Work vehicle 100 can be an operator-driven windrower or an autonomous windrower. Work vehicle 100 includes a pair of front wheels 102, a pair of rear wheels 103, and a chassis 104 (which can also be referred to as a work vehicle frame 104 or windrower frame 104) coupled to and supported by the wheels 102, 103. An operator's cab 105 may be supported by a portion of the chassis 104 and may house various input devices for permitting an operator to control the operation of work vehicle 100 and/or mower-conditioner 101. Additionally, work vehicle 100 may include an engine and a transmission mounted on chassis 104. The transmission may be operably coupled to the engine and may provide variably adjusted gear ratios for transferring engine power to wheels 102 via a drive axle assembly.

As is generally understood, mower-conditioner 101 includes frame 130, cutting mechanism 108, a crop conditioner, and a swath gate (cutting mechanism 108, the crop conditioner, and the swath gate each being coupled with frame 130). Frame 130 (which can be referred to as mower-conditioner machine frame 130, machine frame 130, or header frame 130) can be that to which all of the components of mower-conditioner 101 are directly or indirectly coupled. Cutting mechanism 108 is configured for cutting standing crop material 136 and further for conveying crop material 136 rearwardly. Cutting mechanism 108 can be configured as a plurality of rotating discs which sever crop material 136, or, alternatively, as a plurality of reciprocating knives (such as a sicklebar). In a crop flow direction, subsequent to cutting mechanism 108 crop material 136 encounters the crop conditioner. The crop conditioner includes two conditioner rolls (not shown)(which are coupled with frame 130), which rotate opposite one another and form a gap therebetween, through which the cut crop material 136 flows so as to be conditioned (i.e., breaking, splitting, bending, crushing, cracking, and/or crimping crop material 136). One or both conditioner rolls can be driven, at least indirectly, by a mechanical input to mower-conditioner 101 from vehicle 100. Subsequent to the conditioner rolls, a mat of crop material 136 strikes an underside of the swath gate, in order to form a wide swath of crop material on the ground, or a narrower windrow, depending upon positioning of the swath gate. Subsequent to the swath gate, crop material 136 can, optionally strike a pair windrow shields (which can also be referred to as side shields) of vehicle 100, which can be positioned so as to form a windrow of crop material 136 on the ground.

Further, vehicle 100 includes a lift device 106 and a tilt device 107, each coupled with frame 104 (such that header 101 is coupled with devices 106, 107). Lift device 106 includes a left side lift arm 109A, a right side lift arm 109B, a left side actuator 110A, and a right side actuator 110B (device 106, and thus also each of 109A, 109B, 110A, 110B, being coupled with frame 104). Arms 109A, 109B releasably couple with frame 130 of header 101, more specifically, with left and right portions of header 101, respectively. Actuators 110A, 110B are configured for raising and lowering arms 109A, 109B, and thus also header 101 (to which arms 109A, 109B are attached), and thus for changing positions of header 101 with respect to a height of header 101 off the ground. Further, tilt device 107 is coupled with frame 130 of header 101 and includes an actuator 111 which is configured for tilting header 101 fore and aft about a transversely extending pivot axis. Actuators 110A, 110B, 111 can be any suitable type of actuators. By way of example and not limitation, actuators 110A, 110B, 111 can be a fluid actuator (such as a hydraulic actuator or a pneumatic actuator), an electric actuator (such as an electromechanical actuator or an electrohydraulic actuator), an electronic actuator, and/or a mechanical actuator. Herein, actuators 110A, 110B, 111 are discussed as being formed as a fluid actuator, more specifically, as a hydraulic actuator assembly, according to an exemplary embodiment of the present invention. Such hydraulic cylinder assemblies 110A, 110B, 111 can include a cylinder, a piston, and a rod, can be single-acting or double-acting, can be in a hydraulic closed circuit or an open circuit, and can use hydraulic oil as its working fluid. Each rod of actuators 110A, 110B, 111 is configured for extending and retracting. For instance, the rods of actuators 110A, 110B extend to lower header 101 and retract to raise header 101. The rod of actuator 111 extends to tilt header 101 forward and retracts to tilt header 101 rearward. The structures of devices 106, 107, and their coupling with header 101 and the ability to raise and lower header, are known and thus not explained in detail. As will be explained more fully below, lift device 106 is configured for selectively moving (raising or lowering) header 101 between a plurality of positions (which are associated with a height of header 101) including a low position 231, a high position 232, and an intermediate position 233 therebetween, such that header 101 occupies intermediate position 233 when agricultural machine system 135 is in a predetermined mode of operation. The predetermined mode of operation is associated with a predetermined road speed.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of mower-conditioner 101 described above and shown in FIG. 1 is provided only as one example. Thus, it should be appreciated that the present disclosure may be readily adaptable to any manner of mower-conditioner configuration, or other agricultural machines, such as a vehicle and/or implement.

Figure 2:
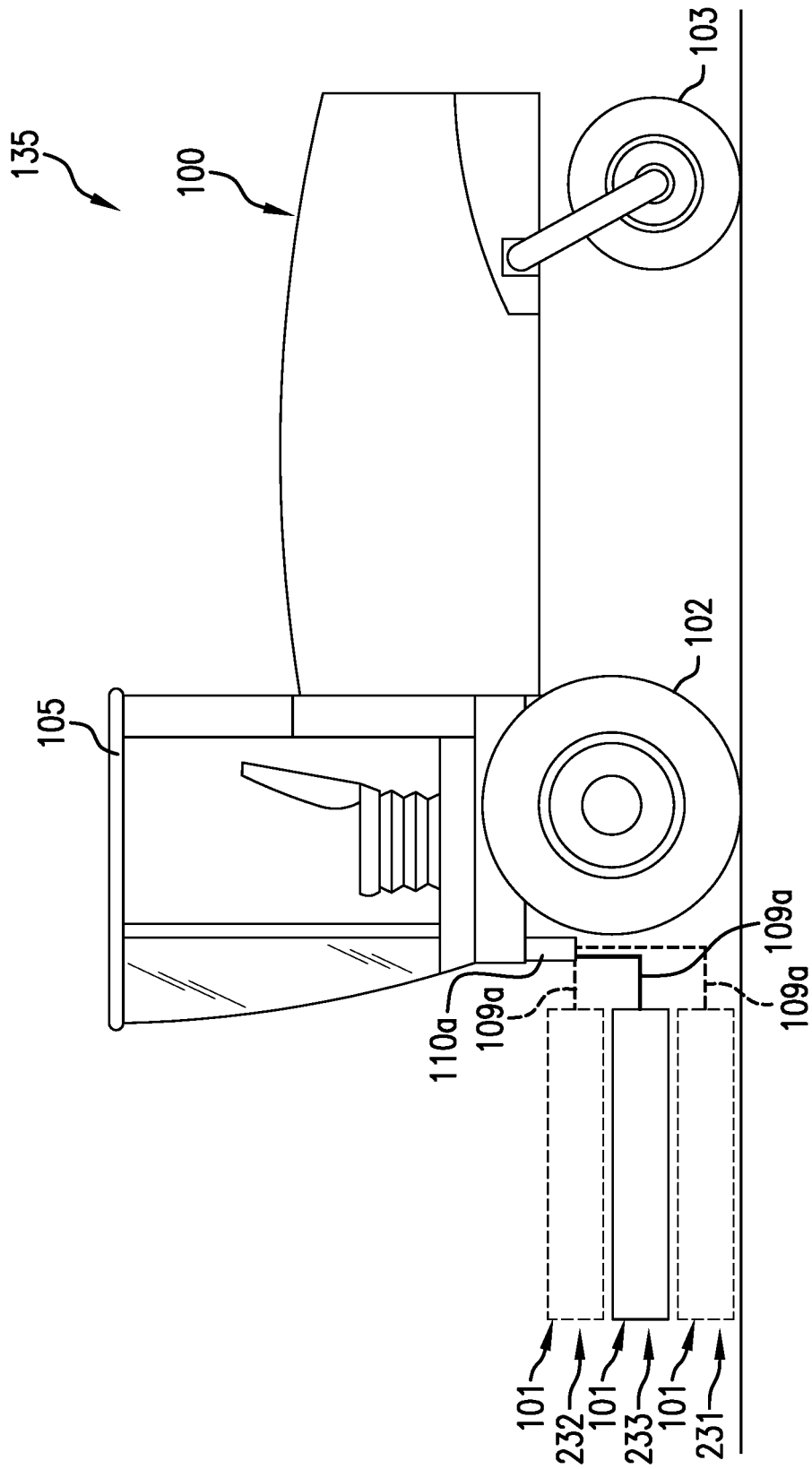
FIG. 2 illustrates schematically a side view of agricultural machine system of FIG. 1, in accordance with an exemplary embodiment of the present invention.

Referring now to FIG. 2, there is shown schematically a side view of agricultural machine system 135, including vehicle 100 and header 101. Header 101 is shown to occupy selectively three different positions: low position 231 (broken lines); high position 232 (broken lines); and intermediate position 233. Left arm 109A (shown schematically as a line or broken lines) is shown attached to header 101 and also in three different positions corresponding to positions 231, 232, 233. Further, arm 109A is coupled with actuator 110A (shown schematically). Though positions 231, 232, 233 are shown stacked and spaced apart relative to one another, this is done so for illustrative purposes; it can be appreciated that positions 231, 232, 233 can be closer together or farther apart compared to what is shown in FIG. 2, though on balance position 231 is the lowest height that header 101 can occupy, position 232 is the highest height that header 101 can occupy, and position 233 is a predetermined intermediate position between positions 231, 232. Position 231 can be such that header 101 is positioned on the ground or, alternatively, can be a lowest mowing height for header 101. Position 232 can be a height that header 101 typically occupies when windrower 101 is moving through a field when not mowing, such as turning in a headland, or when the operator needs header 101 to avoid an obstacle in the field, such as a rock, boulder, stump, a mound of soil, or a bank of soil. However, when system 135 travels at high speed travel (such as a road speed when traveling on hard-surfaced roads) and sudden braking occurs, there is risk that system 135 will pitch forward about front wheels 102 until header 101 contacts the ground. The amount of such pitch forward is greater when header 101 is in position 232 (maximum height) than when header 101 is in intermediate 233, rendering position 233 more advantageous than position 232 when system 135 is traveling at high speeds. Such high speeds can have a predetermined minimum at which speed point header 101 is automatically moved to intermediate position 233, or at which speed point it would be advisable for an operator of system 135 to move header 101 to position 233.

Figure 3:
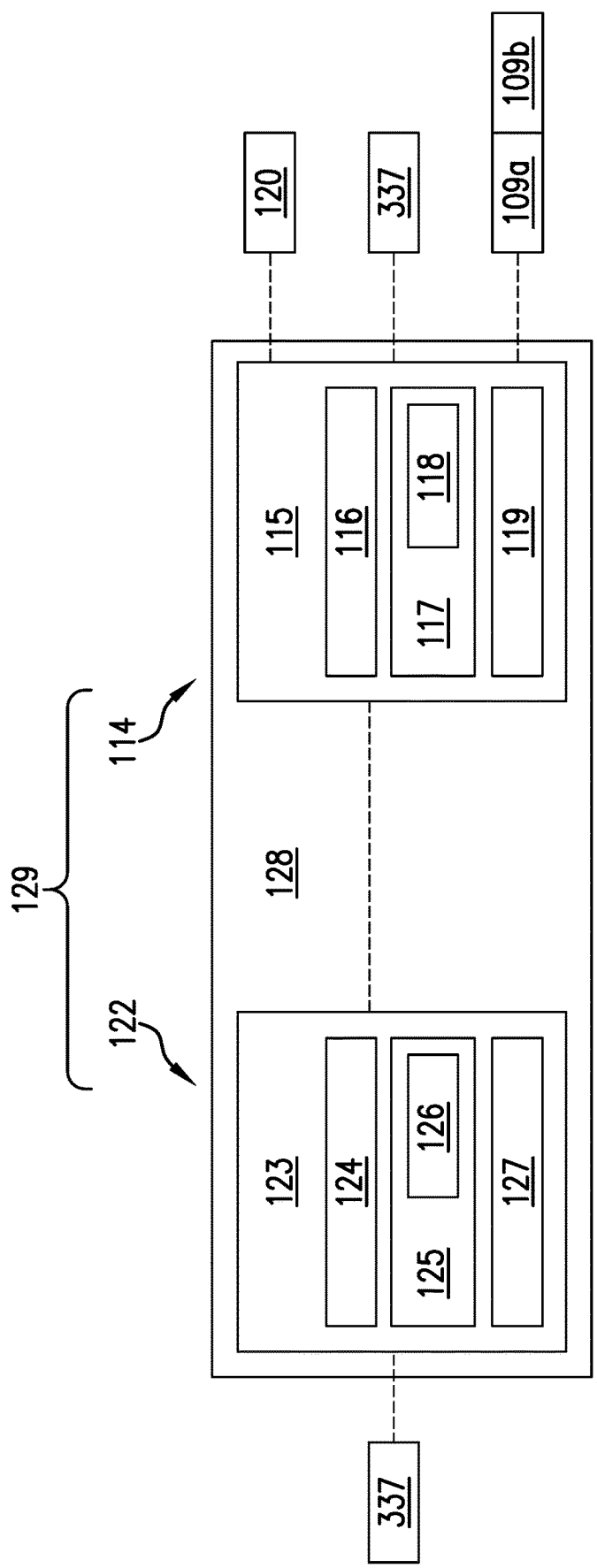
FIG. 3 illustrates schematically a diagram of a control system of the agricultural machine system of FIG. 1, in accordance with an exemplary embodiment of the present invention.

Referring now to FIG. 3, there is shown a control system 129 which agricultural machine system 135 includes. Control system 129 can be referred to as a unified control system 129. Unified control system 129 includes control system 114 of vehicle 100, control system 122 of mower-conditioner 101, and, optionally, a control system (not shown) of a data center (not shown) that is cloud-based, Internet-based, and/or remotely located (this control system of the data center can be substantially similar to control systems 114, 122, having a controller, a processor, memory, data, and instructions, as described below with respect to control systems 114, 122). Control system 114 includes controller 115, and control system 122 includes controller 123. Further, unified system 129 can be said to include controller system 128, which includes controllers 115, 123. Control system 129, and thus also control systems 114, 122, are operatively coupled with each of frames 104, 130, and thus also with vehicle 100 and mower-conditioner 101. Control system 114, in whole or in part, is further included as part of work vehicle 100, and control system 122, in whole or in part, is further included as part of mower-conditioner 101.

Further, work vehicle 100 includes control system 114, which includes controller 115, which includes a processor 116, memory 117, data 118, and instructions 119. Control system 114 can further include an input/output device 120 such as a laptop computer (with keyboard and display), a touchpad (including keypad functionality and a display), and/or one or more switches, device 120 being configured for a user to interface therewith. Device 120 can be a plurality of devices spaced apart, for example, in cab 105 that allows operator to make inputs to controller 115. Control system 114, in whole or in part, can be coupled with frame 104.

Further, mower-conditioner 101 includes control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of mower-conditioner 101. Control system 122, in whole or in part, can be coupled with frame 130.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Vehicle controller 115, herein, is assumed to be the primary controller for controlling operations of vehicle 100, and mower-conditioner controller 123, herein, is assumed to be the primary controller for controlling operations of mower-conditioner 101, though it is understood that at different times each of controllers 115, 123 can control any of the other of the controllers 115, 123. Controllers 115, 123, as indicated in FIG. 3, can be in communication with the other of controllers 115, 123, thereby forming unified control system 129, such that any or all information associated with any controller 115, 123 can be shared with the other of controllers 115, 123, and any controller 115, 123 can perform the functions of the other controllers 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Controllers 115, 123 can be configured to perform any of the functions of any of the other controllers 115, 123. Controllers 115, 123 can be a part of any network facilitating such communication therebetween, such as a local area network, a metropolitan area network, a wide area network, a neural network, whether wired or wireless. Control system 129, and controller system 128, are operatively coupled with vehicle 100 and mower-conditioner 101, in particular with frames 104, 130. According to an embodiment of the present invention, vehicle controller 115 can issue commands to mower-conditioner controller 123. This is assumed to be the case herein, unless otherwise stated. According to an alternative embodiment of the present invention, mower-conditioner controller 123 can issue commands to vehicle controller 115 (such as for ISOBUS III or higher implements and/or vehicles). This is assumed to be the case herein, unless otherwise stated.

Control system 129 can include additional sensors or other inputs. Control system 114 can further include a GPS (not shown) mounted on vehicle 100 (the vehicle GPS). The vehicle GPS senses the location of vehicle 100 within the field, as is known, and this data can be provided to controllers 115, 123. Similarly, control system 122 can further include a GPS (not shown) mounted on mower-conditioner 101 (the mower-conditioner GPS). The mower-conditioner GPS senses the location of mower-conditioner 101 within the field, as is known, and this data can be provided to controllers 115, 123. Further, the operator, by way of device 120, can input or make certain settings. Control system 129 can further include any number additional control systems (with their individual controllers, processors, memory, data, and instructions, substantially similar to what is described above with reference to control systems 114, 122), and any such control system can have input/output devices as a part thereof and/or connected thereto.

Vehicle 100, and thus also control system 114, can further include at least one sensor 337 coupled with frame 104. Alternatively or in addition thereto, header 101, and thus also control system 122, can include at least one sensor 337 coupled with frame 130. Sensor 337 (regardless as to whether part of vehicle 100 or header 101) is configured for: sensing a header position, that is, the position of header 101; and outputting, to controller 115, a header position signal corresponding to the header position. Sensor 337 can be any suitable sensor and can be positioned in any suitable location so as to be able to detect the position of header 101, such as whether header 101 is occupying positions 231, 232, or 233. Regardless whether sensor 337 is part of vehicle 100 or header 101, sensor 337 can be configured to sense the position of header 101 directly, such as by way of sensing (such as optically, with a camera, lidar, or radar technology) how high header 101 is off of the ground. Alternatively, regardless whether sensor 337 is part of vehicle 100 or header 101, the position of header 101 can be sensed indirectly. For example, sensor 337 can be positioned to detect a position of a respective lift arm 109A, 109B, the position of which directly correlates with the position of header 101. Alternatively, if sensor 337 is part of vehicle 100, sensor 337 can be configured to sense a position of the rod of a respective actuator 110A, 110B, wherein sensor 337 can be positioned external or internal with respect to the cylinder of the respective actuator 110A, 110B.

Further, controller system 128 (such as by way of controllers 115 and/or 123) is configured for: (1) receiving the header position signal; (2) determining a header adjustment based at least in part on the header position signal, the header adjustment being associated with moving header 101 to intermediate position 233 by way of lift device 106; and (3) outputting a header adjustment signal, based at least in part on the header adjustment, to actuator 110A and/or actuator 110B, each of which are configured for adjusting the position of header 101. Regarding (2), controller 128 is configured for determining the header adjustment based at least in part on receiving a signal associated with one of: (a) a first input directing that system 135 (and thus vehicle 100) be operated in the predetermined mode of operation (the predetermined road speed, which correlates with a predetermined high speed of vehicle 100); and (b) a second input directing header 101 to be placed in intermediate position 233. Thus, (a) and (b) provide alternative embodiments of the present invention.

Regarding (a), an operator can input a command into device 120 (whether by screen, switch, or the like) commanding that vehicle 100 take up the predetermined mode of operation, that is, the predetermined road mode of operation (which is a relatively high speed for vehicle 100). When controller 115 receives the signal corresponding to this command, controller 115 is triggered to not only adjust the speed of vehicle 100 but also to move header 101 to intermediate position 233. In this way, when the predetermined road speed is selected by operator, controller 115 automatically adjusts the height of header 101 to intermediate position 233 (this predetermined speed can be selected in other ways as well, such as by way of a vehicle accelerator pedal, which can be deemed to be part of device 120 herein).

Regarding (b), after the operator selects the predetermined road mode of operation, the operator inputs an additional command into device 120 commanding that header 101 move to intermediate position 233, wherein this command sends a signal to controller 115 and thereby commands controller 115 to raise or lower header 101 to intermediate position 233. In other words, the selection of the predetermined road mode of operation by the operator does not automatically cause controller 115 to move header 101 to intermediate position 233. Instead, the operator must enter the additional command after the road mode of operation is selected, namely, the command to move the header to intermediate position 233. In this way, the operator can ensure that header 101 will not be unintentionally lowered onto something before header 101 is indeed lowered to intermediate position 233.

In use, an operator can be mowing a field with system 135. Upon reaching the end of a row of crop material 136, the operator can cause header 101 to raise to its maximum height, such as at position 232. Then, operator may choose, for example, to run vehicle 100 on a hard-surfaced road and upon doing so operator may choose to run vehicle 100 at a relatively high road speed. In so doing, operator may select the "road" mode of operation, thereby enabling high speed operation. Upon doing so, according to one embodiment of the present invention, controller system 128 automatically lowers header 101 from the highest lift height position 232 to intermediate lift height position 233. At this lift height of position 233, should the parking brake engage unintentionally, header 101 will contact the ground sooner than at the highest lift height position 232, resulting in less rotation about the front wheel contact patch, and less lift of the rear wheels 103 during the event. According to another embodiment of the present invention, after operator selects the "road" mode of operation, operator can look around system 135 and ensure that header 101 would not be lowered onto something when header 101 moves to intermediate position 233. Upon making this assurance, operator can then enter a command via device 120 for controller 115 to lower header 101 to intermediate position 233.

Figure 4:
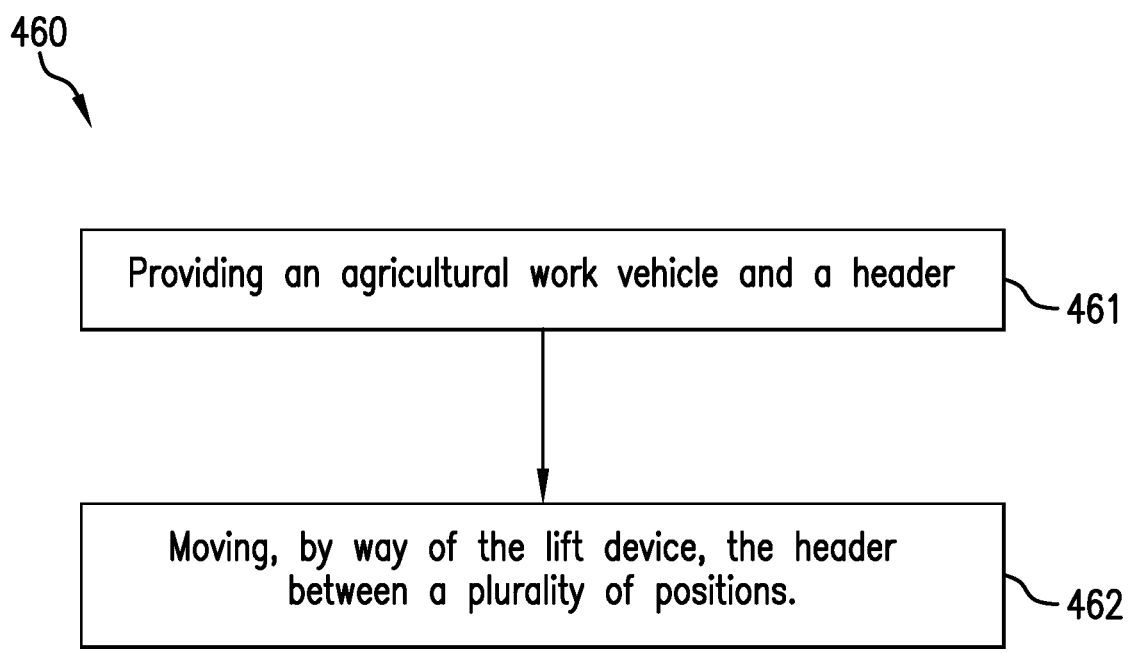
FIG. 4 illustrates a flow diagram showing a method of using an agricultural machine system, in accordance with an exemplary embodiment of the present invention.

Referring now to FIG. 4, there is shown a flow diagram showing a method 460 of using an agricultural machine system 135. The method 460 includes the steps of: providing 461 an agricultural work vehicle 100 and a header 101, the agricultural work vehicle 100 including a lift device 106, the header 101 being coupled with the lift device 106; and moving 462 selectively, by way of the lift device 106, the header 101 between a plurality of positions 231, 232, 233 associated with a header height including a low position 231, a high position 232, and an intermediate position 233 therebetween such that the header 101 occupies the intermediate position 233 when the agricultural machine system 135 is in a predetermined mode of operation. Further, the agricultural work vehicle 100 is a self-propelled windrower 100. Further, the predetermined mode of operation can be associated with a predetermined road speed. Further, agricultural machine system 135 further includes a control system 129 operatively coupled with the agricultural work vehicle 100 and the header 101, the control system 129 including: a sensor 337 configured for: sensing a header position; outputting a header position signal corresponding to the header position; a controller system 128 configured for: receiving the header position signal; determining a header adjustment based at least in part on the header position signal, the header adjustment being associated with moving the header 101 to the intermediate position 233; outputting a header adjustment signal, based at least in part on the header adjustment, to an actuator 110A and/or 110B configured for adjusting the header position. Further, the controller system 128 can be configured for determining the header adjustment based at least in part on receiving a first signal associated with: (1) a first input directing that the self-propelled windrower 100 be operated in the predetermined mode of operation; or (2) a second input directing the header 101 to be placed in the intermediate position 233.

It is to be understood that the steps of method 460 are performed by controller 115, 123, 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123, 128 described herein, such as the method 460, is implemented in software code or instructions which are tangibly stored on a tangible computer readable medium. The controller 115, 123, 128 loads the software code or instructions via a direct interface with the computer readable medium or via a wired and/or wireless network. Upon loading and executing such software code or instructions by controller 115, 123, 128, controller 115, 123, 128 may perform any of the functionality of controller 115, 123, 128 described herein, including any steps of the method 460.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural machine system, comprising:
   an agricultural work vehicle including a lift device, wherein the agricultural work vehicle is a self-propelled windrower;
   a header coupled with the lift device, the lift device configured for selectively moving the header between a plurality of positions associated with a header height including a low position, a high position, and an intermediate position therebetween such that the header occupies the intermediate position when the agricultural machine system is in a predetermined mode of operation that is associated with a predetermined road speed.

2. The agricultural machine system of claim 1, further comprising a control system operatively coupled with the agricultural work vehicle and the header, the control system including:

a sensor configured for:
  sensing a header position;
  outputting a header position signal corresponding to the header position;
a controller system configured for:
  receiving the header position signal;
  determining a header adjustment based at least in part on the header position signal, the header adjustment being associated with moving the header to the intermediate position;
  outputting a header adjustment signal, based at least in part on the header adjustment, to an actuator configured for adjusting the header position.

3. The agricultural machine system of claim 2, wherein the controller system is configured for determining the header adjustment based at least in part on receiving a first signal associated with one of:
  (1) a first input directing that the self-propelled windrower be operated in the predetermined mode of operation; and
  (2) a second input directing the header to be placed in the intermediate position.

4. An agricultural work vehicle of an agricultural machine system, wherein the agricultural work vehicle is a self-propelled windrower, the agricultural work vehicle comprising:
  a lift device, the agricultural work vehicle configured for being coupled with a header, the lift device being configured for selectively moving the header between a plurality of positions associated with a header height including a low position, a high position, and an intermediate position therebetween such that the header occupies the intermediate position when the agricultural machine system is in a predetermined mode of operation that is associated with a predetermined road speed.

5. The agricultural work vehicle of claim 4, wherein a control system of the agricultural machine system is operatively coupled with the agricultural work vehicle and configured for being operatively coupled with the header, the control system including:
  a sensor configured for:
    sensing a header position;
    outputting a header position signal corresponding to the header position;
  a controller system configured for:
    receiving the header position signal;
    determining a header adjustment based at least in part on the header position signal, the header adjustment being associated with moving the header to the intermediate position;
    outputting a header adjustment signal, based at least in part on the header adjustment, to an actuator configured for adjusting the header position.

6. The agricultural work vehicle of claim 5, wherein the controller system is configured for determining the header adjustment based at least in part on receiving a first signal associated with one of:
  (1) a first input directing that the self-propelled windrower be operated in the predetermined mode of operation; and
  (2) a second input directing the header to be placed in the intermediate position.

7. A method of using an agricultural machine system, the method comprising the steps of:
  providing an agricultural work vehicle and a header, the agricultural work vehicle including a lift device, the header being coupled with the lift device, wherein the agricultural work vehicle is a self propelled windrower; and
  moving selectively, by way of the lift device, the header between a plurality of positions associated with a header height including a low position, a high position, and an intermediate position therebetween such that the header occupies the intermediate position when the agricultural machine system is in a predetermined mode of operation that is associated with a predetermined road speed.

8. The method of claim 7, wherein the agricultural machine system further comprises a control system operatively coupled with the agricultural work vehicle and the header, the control system including:
  a sensor configured for:
    sensing a header position;
    outputting a header position signal corresponding to the header position;
  a controller system configured for:
    receiving the header position signal;
    determining a header adjustment based at least in part on the header position signal, the header adjustment being associated with moving the header to the intermediate position;
    outputting a header adjustment signal, based at least in part on the header adjustment, to an actuator configured for adjusting the header position.

9. The method of claim 8, wherein the controller system is configured for determining the header adjustment based at least in part on receiving a first signal associated with one of:
  (1) a first input directing that the self-propelled windrower be operated in the predetermined mode of operation; and
  (2) a second input directing the header to be placed in the intermediate position.

* * * * *